US009785438B1

(12) United States Patent
Weikal

(10) Patent No.: US 9,785,438 B1
(45) Date of Patent: Oct. 10, 2017

(54) MEDIA CACHE CLEANING BASED ON WORKLOAD

(71) Applicant: Seagate Technology LLC, Cupertino, CA (US)

(72) Inventor: Adam Weikal, Butler, PA (US)

(73) Assignee: SEAGATE TECHNOLOGY LLC, Cupertino, CA (US)

( * ) Notice: Subject to any disclaimer, the term of this patent is extended or adjusted under 35 U.S.C. 154(b) by 725 days.

(21) Appl. No.: 13/832,172

(22) Filed: Mar. 15, 2013

Related U.S. Application Data

(60) Provisional application No. 61/712,707, filed on Oct. 11, 2012.

(51) Int. Cl.
*G06F 12/00* (2006.01)
*G06F 9/30* (2006.01)
*G06F 12/02* (2006.01)
*G06F 12/0866* (2016.01)

(52) U.S. Cl.
CPC ........ *G06F 9/3004* (2013.01); *G06F 12/0246* (2013.01); *G06F 12/0866* (2013.01)

(58) Field of Classification Search
CPC ............. G06F 12/0868; G06F 12/0811; G06F 12/0891; G06F 3/0676; G06F 2003/0692; G06F 9/3004; G06F 12/0246; G06F 12/0866
See application file for complete search history.

(56) References Cited

U.S. PATENT DOCUMENTS

| 7,231,497 | B2 | 6/2007 | Trika |
| 7,440,221 | B2 | 10/2008 | Tsuchinaga |
| 7,965,465 | B2 | 6/2011 | Sanvido |
| 7,966,456 | B2 | 6/2011 | Trika |
| 7,970,989 | B2 | 6/2011 | Matthews |
| 7,982,994 | B1 | 7/2011 | Erden |
| 8,179,627 | B2 | 5/2012 | Chang |
| 8,270,256 | B1 | 9/2012 | Juang |
| 8,300,341 | B2 | 10/2012 | Itakura |
| 8,310,786 | B2 | 11/2012 | Fuente |
| 8,341,339 | B1 * | 12/2012 | Boyle ................. G06F 12/0246 711/103 |
| 8,363,349 | B2 * | 1/2013 | Haga ..................... B82Y 25/00 360/48 |

(Continued)

OTHER PUBLICATIONS

Design Issues for a Shingled Write Disk System, Ahmed Amer, et al.; © 2010 IEEE.

(Continued)

*Primary Examiner* — David X Yi
*Assistant Examiner* — Tahilba Puche
(74) *Attorney, Agent, or Firm* — Cesari & Reed, LLP; Kirk A. Cesari

(57) ABSTRACT

This disclosure is related to media cache cleaning based on workload. In some examples, a read-modify-write (RMW) operation may merge new data with existing data and the merge may be interrupted without losing the amount of work already processed. This can be particularly useful for shingled magnetic recording (SMR) systems that utilize a large cache, such as a media cache, that can accumulate many entries that might need to be merged with existing data. An RMW operation can be interrupted such that a host command does not timeout.

19 Claims, 4 Drawing Sheets

(56) References Cited

U.S. PATENT DOCUMENTS

| | | | |
|---|---|---|---|
| 8,593,748 B1 * | 11/2013 | Bandic | G11B 19/045 360/31 |
| 2005/0144396 A1 | 6/2005 | Eschmann | |
| 2011/0085266 A1 | 4/2011 | Kanai | |
| 2011/0138106 A1 | 6/2011 | Prabhakaran | |
| 2011/0292545 A1 | 12/2011 | Katada | |
| 2011/0299373 A1 | 12/2011 | Ho | |
| 2012/0060073 A1 | 3/2012 | Itakura | |
| 2012/0069466 A1 | 3/2012 | Okamoto | |
| 2012/0099216 A1 | 4/2012 | Grobis | |
| 2012/0162808 A1 | 6/2012 | Masuda | |
| 2012/0194937 A1 | 8/2012 | Tagami | |
| 2012/0212847 A1 | 8/2012 | Sato | |
| 2012/0233432 A1 | 9/2012 | Feldman | |
| 2012/0250174 A1 | 10/2012 | Sueishi | |
| 2012/0300328 A1 | 11/2012 | Coker | |
| 2012/0300333 A1 | 11/2012 | Tinker | |
| 2012/0303867 A1 | 11/2012 | Hall | |
| 2012/0303884 A1 | 11/2012 | Hall | |
| 2012/0303889 A1 | 11/2012 | Coker | |
| 2012/0303928 A1 | 11/2012 | Hall | |
| 2012/0307400 A1 | 12/2012 | Kawabe | |
| 2013/0027802 A1 | 1/2013 | Kim | |
| 2013/0027806 A1 | 1/2013 | Cho | |
| 2013/0031296 A1 | 1/2013 | Na | |
| 2013/0031306 A1 | 1/2013 | Kim | |
| 2013/0031317 A1 | 1/2013 | Ryu | |
| 2013/0031406 A1 | 1/2013 | Cho | |
| 2013/0038960 A1 | 2/2013 | Song | |
| 2013/0038961 A1 | 2/2013 | Song | |

OTHER PUBLICATIONS

Emulating a Shingled Write Disk, Rekha Pitchumani, et al., International Symposium on Modeling, Analysis, and Simulation of Computer and Telecommunication Systems, At Washington, DC (Aug. 2012).

* cited by examiner

… (1)

MEDIA CACHE CLEANING BASED ON WORKLOAD

CROSS REFERENCE TO RELATED APPLICATIONS

The present application claims priority to U.S. provisional patent application Ser. No. 61/712,707, filed Oct. 11, 2012, entitled "Media Cache Cleaning Based on Host Workload", the contents of which are hereby incorporated by reference in its entirety.

BACKGROUND

The present disclosure relates to data storage devices, and more specifically to data storage devices that use read-modify-write (RMW) operations, such as shingled magnetic recording (SMR). Methods and apparatuses are provided that maximize media cache cleaning efficiency in a system where there are a fixed number of tracks belonging to a band.

SUMMARY

In one embodiment, a processor may be configured to store received data to a cache memory when received from a host, merge the received data with existing data to obtain merged data, and interrupt the merge to allow another command to be executed.

In another embodiment, a method may include performing a read-modify-write operation to merge new data with existing data, interrupting a merge of the new data with the existing data to obtain partially merged data, and writing the partially merged data to a first location on a data storage medium.

In yet another embodiment, an apparatus can include a computer readable data storage medium storing instructions that when executed by a processor, cause the processor to perform a method. The method may include reading new data from a cache memory into a buffer, reading existing data from a nonvolatile data storage medium, starting a merge of the new data with the existing data, interrupting the merge to obtain partially merged data, and writing the partially merged data to a first location on a data storage medium.

DETAILED DESCRIPTION

In the following detailed description of the embodiments, reference is made to the accompanying drawings which form a part hereof, and in which are shown by way of illustration of specific embodiments. It is to be understood that other embodiments may be utilized and structural changes may be made without departing from the scope of the present disclosure.

In some embodiments, a data storage device may have one or more data storage mediums, such as discs having tracks for storing data. A disc may be divided into multiple zones and each zone may have different configurations of various options, such as data track format, direction of writing from a transducer, data density, or intended uses for storing data. For example, a disc may have a zone designated as a media cache intended for sequential storage of data in a non-shingled track manner. The disc may also have one or more zones designated for data storage in a shingled track manner. The disc may further have at least one zone designated for spare sectors.

A media cache may be a reserved space on data storage medium that is not statically mapped to user LBAs and can be used to store incoming data in a relatively quick succession. The media cache can have a relatively large capacity with specific attributes such as long latency with high throughput and may be used when a large amount of data associated with one or more write operations have to be stored quickly, such as when audio or video data is streamed from a host. In a particular embodiment, the media cache may be located on a disc or on a solid state non-volatile memory, and may be found in a reserved section of a DSD. A media cache can allow greater throughput of storing data to the data storage device than if the data storage device had to write data to LBA mapped areas or to a shingled track band every time a write request from the host occurred. In some embodiments, a media cache may have a self-describing structure in that a header of the media cache identifies the data stored therein.

Figure 1:
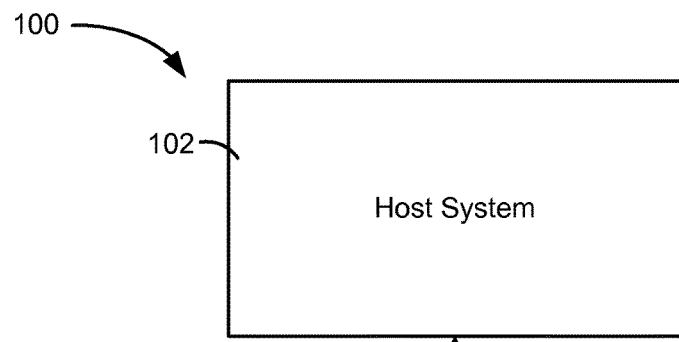
FIG. 1 is a diagram of an illustrative embodiment of a system designed for media cache cleaning based on workload.

FIG. 1 depicts an embodiment of a system for media cache cleaning based on workload, generally designated 100. The system 100 may include a host 102 and a data storage device (DSD) 104. The host 102 may also be referred to as the host system or host computer. The host 102 can be a desktop computer, a laptop computer, a server, a tablet computer, a telephone, a music player, another electronic device, or any combination thereof. Similarly, the DSD 104 may be any of the above-listed devices, or any other device which may be used to store or retrieve data. The host 102 and DSD 104 may be connected by way of a wired or wireless connection, or by a local area network (LAN) or wide area network (WAN). In some embodiments, the DSD 104 can be a stand-alone device not connected to a host 102, or the host 102 and DSD 104 may both be part of a single unit.

The DSD 104 can include one or more nonvolatile memories. In the depicted embodiment, the DSD 104 could be a hybrid storage device, such as with both a disc memory 106 and non-volatile solid state memory 108. In other embodiments, the DSD 104 may contain additional memories or memory types, including volatile and nonvolatile memories.

In an embodiment of system 100, the disc memory 106 can have one or more zones configured to store data on shingled data tracks using shingled recording, such as shingled magnetic recording (SMR). SMR is a recording method and track structure to increase data recording density on a disc, whereby a track of data partially overlaps an adjacent data track. SMR will be discussed in more detail with regard to FIG. 2.

Figure 2:
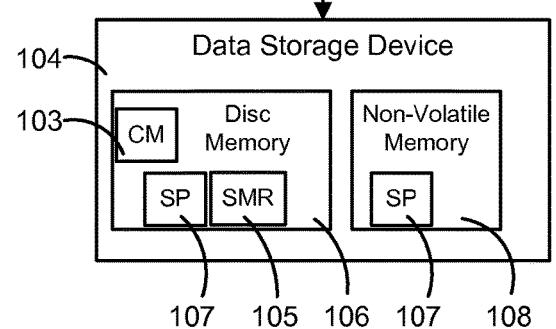
FIG. 2 is a diagram of an illustrative embodiment of a system designed for media cache cleaning based on workload.

SMR is a structure and scheme of executing a write operation in one radial direction across a disc, where at least one track partially overlaps an adjacent track similar to roofing shingles. Referring to FIG. 2, if it is assumed that writing is performed in an arrow-indicated direction in a shingle-write system, when writing is performed on track N, adjacent track N−1 is partially overwritten. Also, when writing is performed on track N+1, adjacent track N is partially overwritten. In contrast to recording methods whereby each track is written without any intended overlap, SMR can result in an increase of the tracks per inch (TPI) characteristic as a recording density in a radial direction of a storage medium.

SMR can generate flux in one direction. Therefore, a constraint that N−1 track cannot be written after the N track is written should be met. For this reason, writing to shingled tracks may require a different writing strategy than with non-shingled tracks.

Due to the single-write direction of SMR, writing a given track N−1 after track N has been written may require rewriting all shingled tracks that follow track N−1 (i.e. track N, track N+1, track N+2, etc.). In order to accomplish this realistically, a set of tracks may be grouped into a "band," with the band ending with a guard track. In some embodiments, the guard track can be a non-shingled track, or a shingled track which is not used to record data. When track N−1 needs to be re-written, tracks N−1 through the guard track can be rewritten, while tracks in other bands may not be affected. The tracks that comprise a band can be further divided into a plurality of logical block addresses (LBAs), with data stored to each LBA corresponding to a physical location.

In an embodiment, a DSD employing SMR may receive a write command that might cause the DSD to overwrite one or more shingled tracks in a band. The data to be written may come from a host device, a main storage area, a media, or another location. One way to write to a shingled storage can include reading data from multiple tracks of a band of a shingled storage area, modifying the data, writing the modified data into a scratchpad area, and then writing the modified data to the main storage. This can be called a read-modify-write-write operation (RMWW). The extra step of using a scratchpad can be useful because once data are written to the scratchpad, after such, most of the data would be stored in two nonvolatile memory locations. This can protect the data if an event occurs that could affect the write from the buffer to the main storage, such as a power failure. In some embodiments, the scratchpad can be an area on a disc, a nonvolatile solid state memory such as Flash memory, or any combination thereof. Multiple scratchpads can be different sizes and may or may not be on the same medium.

Figure 3:
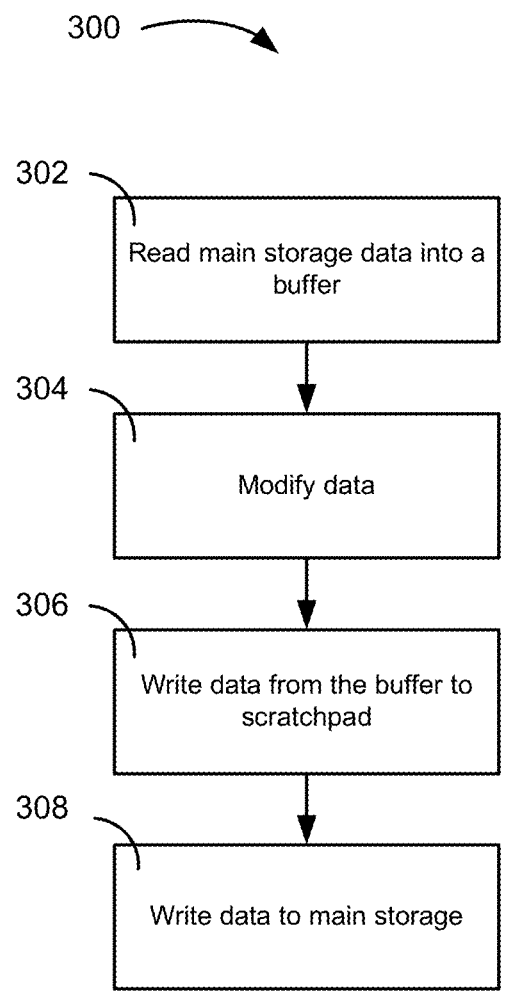
FIG. 3 is a diagram of an illustrative embodiment of a method of read-modify-write-write operations.

FIG. 3, generally designated 300, illustrates an embodiment of a method of read-modify-write-write operations. Generally, to write to a band of shingled tracks, a device may read all of the data from a band into a buffer, at 302, modify the data that is to be updated, at 304, write the data from the buffer to a scratchpad, at 306, and finally write the data to the main storage, at 308. However, in some embodiments, a data storage device (DSD) may receive data from a host that is stored to a media cache while a shingled track zone is used for main storage, though in some instances the media cache can also be a shingled track zone or band. New data sent to the DSD may be stored in the media cache until they can be written to the main storage. Over time, the media cache can acquire various amounts of data and may fill a designated capacity of the media cache. In order to prevent the media cache from completely filling capacity, it may be necessary to clean the media cache, that is, distribute the data stored in the media cache to the respective physical locations of the main storage associated with the LBAs of such data. In some situations, potentially hundreds of unique user data blocks in the media cache may need to be moved to other locations.

In some SMR systems, where writes can only be accomplished in one direction, the cleaning might have to be performed using large ranges that match the sectors-per-band. An issue with this cleaning method is that the number of unique user data blocks in the media cache can be high enough that a new host command times out while the cleaning operation works to complete. For example, suppose a cleaning operation is currently set up to read 1,500 unique user blocks of data that are to be merged in a read-modify-write-write operation. If a host command, such as a write command, is issued that requires a new operation, the new operation may have to wait until the data in the media cache is merged and the host command will need to wait for all 1,500 unique reads to complete the merge process. Depending on the system, the write may timeout on the host as the 1,500 reads can take over 6 seconds to complete.

One possible way to fix this problem can be to prevent cleaning in the first place and only merge in new host data for a read-modify-write-write operation. This can work by removing the need to read all 1,500 unique blocks but could hurt the overall performance of cleaning because the read and write of that range will need to be done again later. Furthermore, this fix may only work if the host write occurred before the decision was made to clean.

Another possible option is to allow more than one read-modify-write-write operation in the system at a time so that the new host write could be handled while the cleaning reads are ongoing. Ignoring any extra complexity that having multiple read-modify-write-writes in the system at a time could bring, there may still be the potential for timeouts when a host reset is issued and all cached writes are required to be transferred within the timeout period.

In the options above, aborting a read-modify-write-write could be done but then all the work up until that point could be lost and cleaning performance might suffer. Thus, another option could be to prohibit user data from certain host logical block address (LBA) ranges from entering into the media cache if the number of blocks in the media cache compared to the number of blocks in the main storage for a given range is too large. This could prevent the number of reads needed to merge from being too large. An issue with this method is that the media cache might not be able to mitigate the performance loss associated with writing to the main store for the ranges that have met that threshold.

An issue then is to maximize cleaning efficiency while not having a command time out or holding off the host too long, regardless of workload. If cleaning needs to finish quickly, the read-modify-write-write can finish the current read, then merge and write the data to the buffer and the main storage and a scratchpad. The data blocks in the media cache corresponding to the merged data can then be invalidated. The cleaning may need to be ended quickly for various reasons including a new host command of higher priority, a system power down, or the DSD going into a low power state. Host commands can grow old, and if a host command ages past a certain threshold, the current merging operation can be stopped to allow the host command to continue. Further, a code can be implemented to determine when to stop merging data based on the age of the host command.

In some examples, the media cache may contain data from several different bands and cleaning can be performed on a band by band basis. The media cache can be searched for data from a particular band. If data from a particular band is found in the cache, the data or a portion of the data can be merged with existing data from the band and then written to the main storage, freeing up space in the media cache for more data. In some embodiments, the process may repeat by searching the media cache for data from another band, such as a next band in a sequence. The cleaning process can be performed as needed, on an ongoing basis, or as an operation during an idle period.

Figure 4:
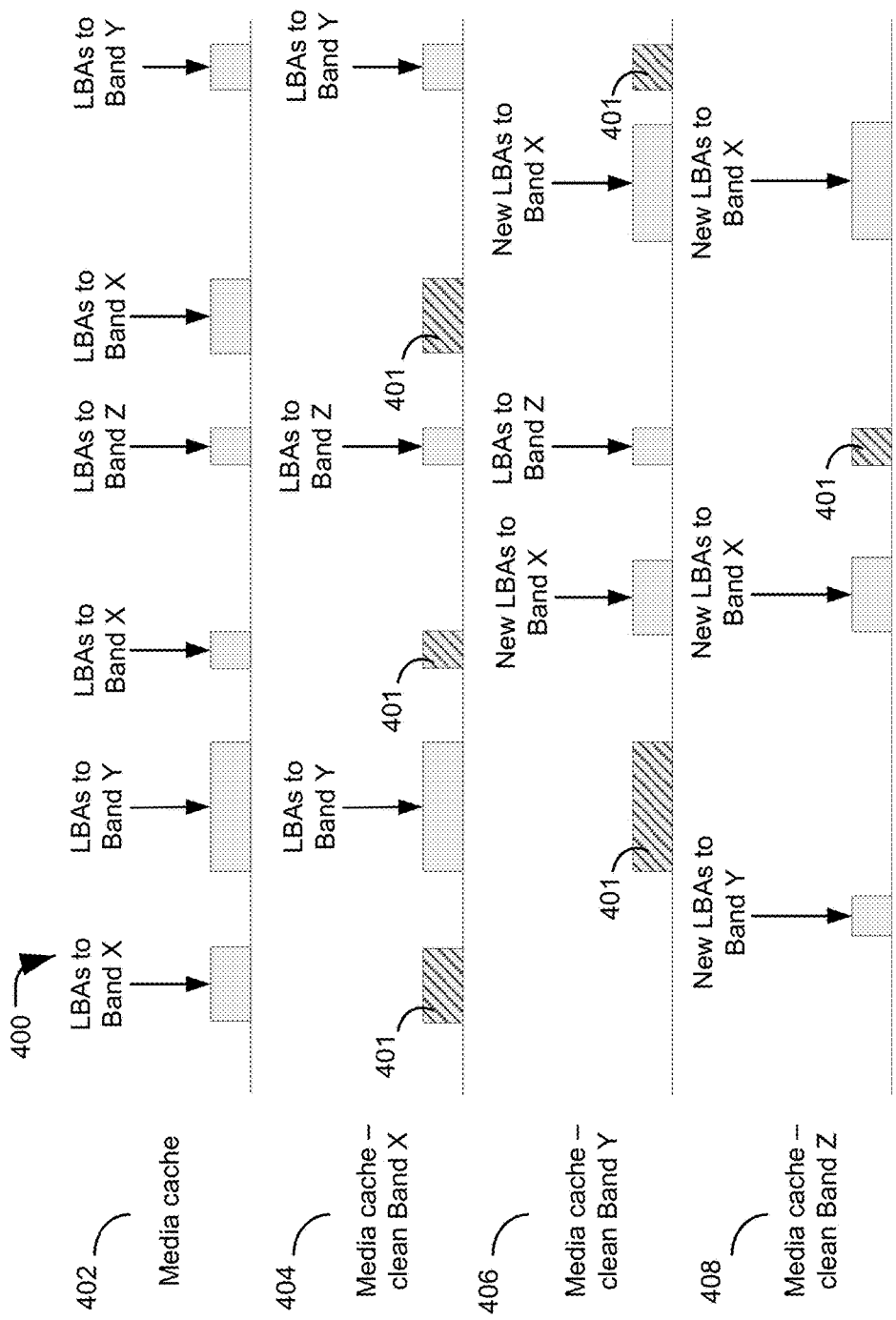
FIG. 4 is a diagram of an illustrative embodiment of a method of media cache cleaning based on workload.

Referring to FIG. 4, a diagram of an illustrative embodiment of a method of media cache cleaning based on workload is shown. In this example, the media cache may contain data from bands X, Y, and Z, which can vary in size and location, at 402. The system controller may implement a band-by-band cleaning of the media cache. Thus, band cleaning may be initiated starting with data corresponding to a selected band, Band X, at 404. Data from Band X can be cleaned; hence, the data in the media cache pertaining to Band X can be stored to a buffer and merged with data from Band X of the main storage, after which the merged data can be stored to a scratchpad and then also stored back to the main storage. Data in the media cache that have already been merged can be marked as invalid, at 401, and may be overwritten.

At 406, the data pertaining to a second band, Band Y, may be cleaned in a similar manner as Band X. In some instances, before a complete cleaning of the media cache can be finished, the DSD may receive new data from the host that is to be written to the media cache, which can include new data for Band X or any other band; also, it is possible that no new data for the media cache may be received during the media cache cleaning process. Further, data pertaining to a third band, Band Z, may be cleaned, at 408. In the illustrative example, at 408, new data for Band Y and new data for Band X have been stored to the media cache. When data for the last band are cleaned, the process may end or repeat; however, host commands or interrupts may prevent the process from repeating.

A media cache cleaning can be a time consuming process; for instance, merging of all the data extents in the media cache associated with a particular band can be numerous and can consume a considerable amount of time. In addition, another time consuming process can occur when the merged data is written to a scratchpad or to a main store, or the combination of both writings if they are not to be interrupted. Host commands, or workload, along with command timeouts and other events such as interrupts, can significantly slow down a cache cleaning.

Figure 5:
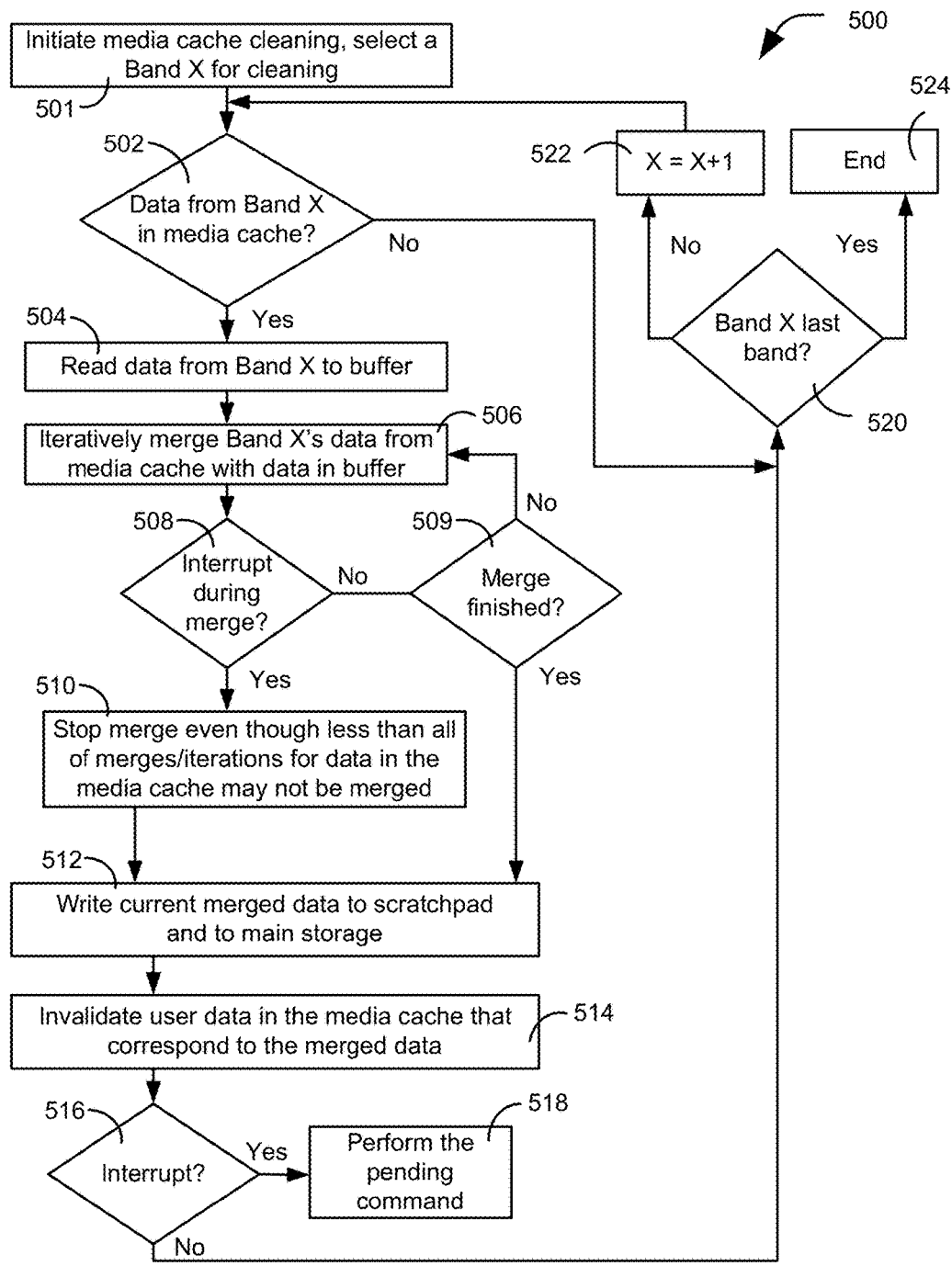
FIG. 5 is a flowchart of an illustrative embodiment of a method of media cache cleaning based on workload.

Referring to FIG. 5 a flow chart illustrating a method to clean a media cache while limiting host timeouts is shown and generally designated 500. As described above, a media cache can act as a buffer between a nonvolatile data storage medium, such as a disc, and a host, where new data from a host may be written to the media cache instead of a physical location associated with a designated LBA.

The method 500 can include a media cache cleaning process being initiated, at 501. A cache cleaning can be initiated by: a processor or controller of a DSD, a command received from a host such as a flush cache command, as a result of available capacity of a cache falling below a threshold, availability of an idle time, after a length of time has passed (i.e. timer expire), a power down or disconnect event is expected, or for any other reason. The purpose of media cache cleaning may be to copy data from the media cache to a main storage, and in systems having a shingled track system, it may be necessary to perform a RMWW operation to copy the data from the media cache to the main storage.

Data associated with a selected band of shingled data, Band X, may be the first data selected to be cleaned from the cache. Band X may be selected based on various criteria; in some examples, Band X may be selected due to an assigned numerical order, may be selected based on a length of time since a last band cleaning, may be selected based on an amount of associated data in a media cache, other criteria, or any combination thereof. Once Band X is selected, the method 500 may determine if there is any data associated with Band X in the media cache, at 502. Data can be associated with a specific band when the specific band includes a physical address mapped to an LBA of the data. Data found in the cache may be new data written to the cache by the host.

When no data is found, there may be no need to clean Band X, and the process can proceed, at 520, to another selected band such as a next sequential numbered band, at 522, or end, at 524. Since a band writing may entail a RMWW that can be time consuming, skipping the RMWW portion of the process for bands that have no associated data in the media cache can save on valuable time, and may help avoid a command time out. When data from Band X are in the media cache, data from Band X on the main storage can be read into a buffer, at 504, and the data associated with Band X that is in the media cache can be merged with the data in the buffer, at 506. The merge may be an iterative process in which data blocks from the media cache that are associated with LBAs of Band X are combined with the previous data of Band X.

However, during a merge there could possibly be thousand of entries in the media cache that need to be merged into a band. Thus, the system may constantly check during the merge process to see if there is new host activity, such as might generate an interrupt to stop merging, at 508. Once new host activity (or another operation) occurs that takes priority over an in-process merge, the system does not have to finish merging the rest of the entries that have not yet been merged, at 510. If there is no interruption of a merge, the merge may finish, at 509. A determination of when to interrupt a merge may be based on time, data integrity, received commands, or other factors. That is, the process may not wait until all the extents/entries merges are complete, and instead the process may write the current merged data from the buffer to the scratchpad and then to the main storage, at 512.

Then, at 514, the process can invalidate the entries in the media cache for the data entries for which the merge and write to the main storage was completed (in an alternate embodiment, the write could be complete when the write to the scratchpad is complete regardless of the write to the main storage). Thus, the process can write the band so as not to waste the time and resources used to merge data entries to that point. Based on a type of command received, if a new write command was received for a band that was currently being merged, the data for the new write command could be added into the current merge process, where a read request may have to wait until after the RMWW, that is after 514, to be handled.

After the current RMWW operation is complete, the method 500 may determine if there are any interrupts or commands that need to be executed, at 516, such as if a host command is pending. In some examples, when a host command is too old, which may be the result of a relatively high workload, there may be a risk of timing out or preventing other host commands from being followed. Thus, the DSD can compare an age of a command against a threshold and then make a determination as to whether the host command is in fact too old. In one example, a check for an old host command can be performed, at 508, because an old host command at this point could be indicative of a problem in either the read or merge steps. When the method determines a command needs to be executed, the media cache cleaning process can be stopped or paused to execute the pending command, at 518.

In some embodiments, the writing to the scratchpad and writing to the main storage may be split into two separate steps, and a check for a pending host command or interrupt may be done between the two separate steps. As shown in one example of the method 500, the user data blocks in the cache corresponding to Band X data may be invalidated, at 514, resulting in the Band X's merged data being cleaned from the media cache.

The process can continually check for interrupts, but the method may only act on them after certain steps of the method are complete, such as not interrupting writing to the main storage, at 512. Since an iteration of the cleaning of Band X's data in the cache may be complete, after 514, the DSD could stop the cache cleaning process without the loss of any work to that point, and thus not incur any wasted time or resources. After any interrupts or commands are dealt with, media cache cleaning can continue, at 518. In some examples, once the data from one band is cleaned from the media cache, the process can start for another band, such as a next sequentially numbered band and the band after that and so forth until the process either ends or is stopped because of a interrupt, a host command, power loss event, or for any other reason. Further, the method may check to see if Band X is the last band to be cleaned, at 520. If so, the process may end, at 524. Otherwise, a new Band X can be selected, such as incremented by one (i.e. a next band is selected), at 522, and the process may start over, at 502. In some instances, the next band may be a sequentially numbered band, where each band has an assigned band identification, or the next band may be selected to provide for an optimal media cache cleaning, such as by ordering the cleaning of the bands based on the band having the most data in the media cache cleaned first, a band with the second most data in the media cache cleaned second, and so on.

In the examples and embodiments disclosed herein, the main storage does not necessarily need to include the most recent data, even after a RMWW operation has been performed, because newer data may be stored in a nonvolatile cache. Thus, if a merge operation is interrupted, the main storage can be written even though newer data is stored in the nonvolatile cache.

On accordance with various embodiments, the methods and processes described herein may be implemented as one or more software programs running on a computer processor or controller device. In accordance with another embodiment, the methods described herein may be implemented as one or more software programs running on a computing device, such as a processor or controller of a disc drive in a personal computing device. Dedicated hardware implementations including, but not limited to, application specific integrated circuits, programmable logic arrays, and other hardware devices can likewise be constructed to implement the methods described herein. Further, the methods and processes described herein may be implemented as a computer readable data storage medium or device including instructions that when executed cause a processor to perform the methods and processes.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Moreover, although specific embodiments have been illustrated and described herein, it should be appreciated that any subsequent arrangement designed to achieve the same or similar purpose may be substituted for the specific embodiments shown.

This disclosure is intended to cover any and all subsequent adaptations or variations of various embodiments. Combinations of the above embodiments, and other embodiments not specifically described herein, will be apparent to those of skill in the art upon reviewing the description. Additionally, the illustrations are merely representational and may not be drawn to scale. Certain proportions within the illustrations may be exaggerated, while other proportions may be reduced. Accordingly, the disclosure and the figures are to be regarded as illustrative and not restrictive.

What is claimed is:

1. An apparatus comprising:
   a disc including:
   a media cache that is a reserved space on the disc that is not statically mapped to user logical block addresses (LBAs);
   one or more data storage zones separate from the media cache that includes shingled data tracks where at least one data track partially overlaps an adjacent data track;
   a processor configured to:
   store received data to the media cache when received from a host;
   start a merge operation to merge the received data with existing data; and
   interrupt the merge to allow another command to be executed, the interrupt producing partially merged data that is less than all of a combination of the received data and the existing data;
   write the partially merged data to the one or more data storage zones; and
   write the partially merged data to a selected memory location of a nonvolatile data storage medium, the selected memory location is a different memory location than the media cache and the one or more data storage zones.

2. The apparatus of claim 1, wherein the data storage medium is the disc and the selected memory location is a scratchpad area to store partially merged data.

3. The apparatus of claim 1, further comprising the media cache is configured to sequentially store data received from the host.

4. The apparatus of claim 1, further comprising:
   the processor further configured to:
   copy the existing data from a first band of the one or more data storage zones to a buffer.

5. The apparatus of claim 4, further comprising:
   the disc includes multiple bands of overlapped tracks including the first band;
   the buffer is a volatile memory;
   the processor further configured to:
   store the received data that includes data for at least two different bands to the media cache;
   copy the existing data from the first band to the buffer;

read a subset of the received data from the media cache; and merge the subset of the received data with the existing data to obtain the partially merged data in the buffer.

6. The apparatus of claim 5, comprising the processor further configured to:

invalidate data in the media cache that corresponds to data of the subset of the received data that was included in the partially merged data.

7. The apparatus of claim 6, comprising the processor further configured to not invalidate data in the media cache that corresponds to data of the subset of the received data that was not included in the partially merged data.

8. The apparatus of claim 4, further comprising:
the disc includes one or more discs;
the media cache is located on the one or more discs; and
the scratchpad is located on the one or more discs.

9. A method comprising:
receiving new data from a host;
storing the new data to a nonvolatile cache;
reading a data storage medium to obtain existing data;
performing a read-modify-write operation to merge the new data with the existing data;
interrupting the merge of the new data with the existing data to obtain partially merged data; and
writing the partially merged data to a first location on the data storage medium; and
writing the partially merged data to a second data storage location different from the first location.

10. The method of claim 9, further comprising:
writing the partially merged data to a second location on the data storage medium;
writing the partially merged data to the first location to replace the existing data; and
invalidating data in the nonvolatile cache that corresponds to a subset of data of the new data that was included in the partially merged data.

11. The method of claim 10, further comprising:
performing a second read-modify-write operation to merge new data remaining in the nonvolatile cache which was not invalidated with data from the first location.

12. The method of claim 9, further comprising:
receiving a command from the host; and
interrupting the merge to prevent the command from timing out.

13. The method of claim 9, further comprising:
copying the existing data from a first shingled band to a buffer;
storing the partially merged data in the buffer; and
writing the partially merged data from the buffer to the first shingled band as the first location.

14. The method of claim 13, further comprising:
storing the new data including data for at least two different shingled bands to the nonvolatile cache;
reading a first subset of the new data from the nonvolatile cache to the buffer, the first subset corresponding to data associated with the first shingled band;
starting the merge between the first subset and the existing data;
interrupting the merge before all data in the first subset is merged with the existing data to obtain the partially merged data; and writing the partially merged data from the buffer to the first shingled band.

15. An apparatus comprising:
a computer memory device storing instructions that when executed by a processor, cause the processor to perform a method including:
reading new data from a cache memory into a buffer;
reading existing data from a nonvolatile data storage medium;
starting a merge of the new data with the existing data;
interrupting the merge to obtain partially merged data; and
writing the partially merged data to a first location of the nonvolatile data storage medium, the partially merged data less than all of a combination of the new data and the existing data; and
writing the partially merged data to a second location of the nonvolatile data storage medium or another nonvolatile data storage medium.

16. The apparatus of claim 15 comprising:
the computer memory device further storing instructions that when executed by the processor, cause the processor to perform the method further including:
writing the partially merged data to the first location to overwrite the existing data; and
invalidating data in the cache memory that corresponds to data of the new data that was successfully merged with the existing data.

17. The apparatus of claim 15 comprising:
the computer memory device further storing instructions that when executed by the processor, cause the processor to perform the method further including:
copying the existing data from a first shingled band to a buffer, each shingled band having at least one data track partially overlapping an adjacent data track; and
writing the partially merged data from the buffer to the first shingled band.

18. The apparatus of claim 15 comprising:
the computer memory device further storing instructions that when executed by the processor, cause the processor to perform the method further including:
storing the new data including data for at least two different shingled bands of a disc data storage medium to a nonvolatile cache memory;
reading a first subset of the new data from the nonvolatile cache memory, the first subset corresponding to data associated with a first shingled band;
starting the merge of the first subset and the existing data;
interrupting the merge before all data in the first subset is merged with the existing data to obtain the partially merged data; and
writing the partially merged data from the buffer to the first shingled band as the first storage location.

19. The apparatus of claim 15 comprising a data storage device, the cache memory is a nonvolatile cache memory on a disc data storage medium of the data storage device, the buffer is a volatile solid state memory of the data storage device, and the processor is configured to store data incoming to the data storage device in a sequential order to the cache memory.

* * * * *